United States Patent
Weisz et al.

[15] 3,644,140
[45] Feb. 22, 1972

[54] METHOD FOR RENDERING CELLULOSIC MATERIALS FLAME RETARDANT

[72] Inventors: Herman S. Weisz; Bernard Scheffler; Lester W. Neely, all of Rock Hill, S.C.

[73] Assignee: M. Lowenstein & Sons, Inc., New York, N.Y.

[22] Filed: Apr. 17, 1970

[21] Appl. No.: 29,480

[52] U.S. Cl. ...................117/119.6, 117/136, 117/143 R
[51] Int. Cl. ...................................B44d 1/46, C09k 3/28
[58] Field of Search...............117/119.6, 136, 193 R; 34/157

[56] References Cited

UNITED STATES PATENTS

| | | | |
|---|---|---|---|
| 3,374,292 | 3/1968 | Zahir | 117/136 X |
| 1,919,747 | 7/1933 | Richardson | 34/157 X |
| 3,101,279 | 8/1963 | Wagner et al. | 117/136 X |
| 3,074,261 | 1/1963 | Wilcox | 34/157 UX |
| 2,101,301 | 12/1937 | Wellmar | 34/157 X |

Primary Examiner—William D. Martin
Assistant Examiner—Harry J. Gwinnell
Attorney—Zalkind & Horne

[57] ABSTRACT

The invention provides a teaching of method and apparatus for utilizing certain substituted phosphono-amide flame retardant containing compositions on cellulosic materials in a manner effective for mass production by continuous movement of the material. In particular, the invention utilizes apparatus which avoids sticking of the material to any conveying means during curing in the utilization of a festoon- or loop-curing-type oven. A critical material temperature range during curing has been found to be particularly effective in the process disclosed herein and the curing may be assisted by means of an auxiliary heater to render certain the maintenance of a predetermined temperature in the material itself as it passes through the oven.

6 Claims, 2 Drawing Figures

INVENTORS
HERMAN S. WEISZ,
BERNARD SCHEFFLER,
LESTER W. NEELY

BY *Falkind & Horne*

ATTORNEYS

METHOD FOR RENDERING CELLULOSIC MATERIALS FLAME RETARDANT

BACKGROUND OF THE INVENTION

This invention relates to the use of substituted phosphono-amide containing compositions of the type disclosed in U.S. Pat. No. 3,374,292 to Zahir and processes utilizing these compositions for rendering cellulosic materials flame-retardant in simple, efficient and economical manner in combination with certain other ingredients.

A serious drawback in using this class of substituted phosphono-amide containing compositions for rendering cellulosic material flame-retardant in the past, was the fact that the phosphono-amide compounds came to the surface of the material during the curing operation resulting in the formation of deposits on the conventionally used rolls. The deposits resulted in considerable pickup on the materials passing through the curing zone. As a result of these deposits, it became necessary to stop production and thoroughly clean the curing rolls prior to the processing of any additional goods or materials. In addition, preliminary tests indicate that the surfacing of the phosphono-amide compounds adversely affected the flame-retardant properties of the cellulosic materials. Thus, the use of these phosphono-amide containing compositions in accordance with prior art methods have proved to be impractical for purposes of achieving a high degree of flame-retardance as well as a continuous, simple, efficient and economical process for rendering cellulosic materials flame-retardant.

There thus remains a need for a method of treating cellulosic materials with these phosphono-amide compounds which overcome the above disadvantages.

OBJECTS OF THE INVENTION

Specifically, it is the primary object of the invention to provide an effective composition for at least significantly rendering cellulosic materials flame retardant, which composition can be readily applied to cellulosic materials and be made available at reasonable prices.

Consistent with this primary object, it is a further object hereof to provide a composition which is in the form of an aqueous solution, and which consists essentially of comparatively inexpensive and readily available ingredients.

Still another, most important object of this invention is to provide an efficient and low cost process for rendering cellulosic materials flame-retardant by treating cellulosic materials with the substituted phosphono-amide containing compositions of interest in the manner set forth in the specification.

A still further object of the invention relates to the providing of a simple, continuous process whereby it is not necessary to halt production of the treated cellulosic materials in order to thoroughly clean the equipment used for curing, as a result of the phosphono-amide compounds coming to the surface of the cellulosic material being treated in accordance with methods known to the prior art.

Yet, still another object of this invention resides in the production of cellulosic materials exhibiting outstanding flame retardant properties when compared to those cellulosic materials treated in accordance with methods known in the prior art.

The invention will be better understood and objects other than those set forth above will become apparent after reading the following detailed description of preferred, yet illustrative, embodiments hereof.

Briefly, the invention utilizes apparatus which provides processing of cellulosic web material through a series of steps involving bleaching, printing or dyeing, soaping for acidity control, padding, i.e., applying flame retardant finish, drying and curing at predetermined temperatures, washing and drying. The particular features of the invention which render these flame-retardant compositions useful for mass production purposes are the maintenance of the web after padding below a particular temperature while drying and while subsequently curing within a preferred temperature range of 320° F-330° F, although a broader range of 310° F-350° F is suitable. It is important that this latter temperature range be a measure of the actual cloth temperature and not the oven temperature and an auxiliary heater may be used in the curing oven for such purpose. In order to achieve true cloth temperatures in this range, the oven must be operated within a temperature range suitable to insure these temperatures in the material itself. These oven temperatures will vary depending upon the material, length of oven and other factors involved. The time of curing is necessarily a variable factor depending upon thickness of cloth and the amount of retardant applied thereto, as well as the actual composition of the retardant as described in the aforementioned patent together with other components which may be added for various purposes. I have discovered it is especially important that the cellulosic web be cured in a loop curer having no heated rolls and no pressure rolls. Such heated or pressure rolls have a tendency to cause exuding of the retardant composition through the cloth to the surface causing it to foul the rolls. Loop-curing apparatus of the kind used successfully with the present invention is manufactured by Proctor and Schwartz Company, Philadelphia, Pennsylvania, model No. K-8956, having nonheated rolls which are power driven but have no pressure or nip rolls.

In general the process utilized in this invention is suitable only for cellulosic material, although it is possible to add a small amount of synthetic fibers thereto up to 10 percent by weight, i.e., polyester fibers.

While a preferred temperature range of the cloth in the curing apparatus has been given above as being from 320° F-330° F, it is preferable that such temperature be kept close to 320° F when utilizing the compositions of the type disclosed herein. These temperatures combined with periods of 3 to 8 minutes in curing a cellulosic web have proven highly satisfactory.

In the initial phases of the present process, it has been found that drying of the web after padding and before curing should be effected at an air temperature which does not exceed 400° F since it has been observed that flame retardant compositions of the type described in the aforementioned patent migrate at higher temperatures to the surface of the cloth causing sublimation in the subsequent curing step, and also decreasing the fire-retardant effect in the finished product.

For purposes of completeness and clarity, a drawing is appended hereto wherein

Figure 1:
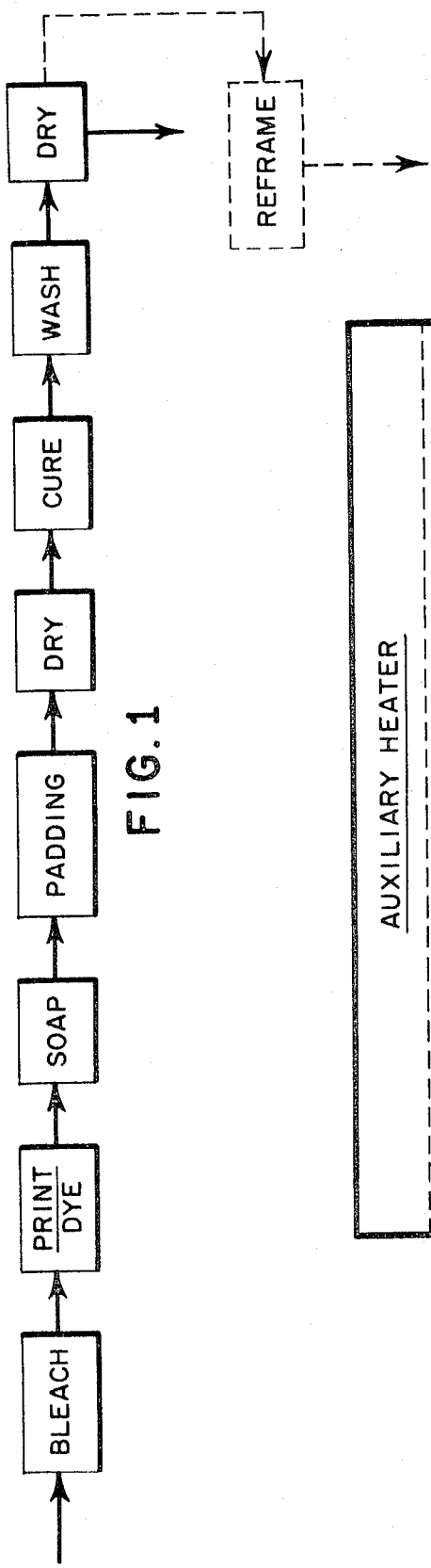
FIG. 1 shows the sequence of process steps.

As noted in FIG. 1, before cellulosic materials are treated in accordance with this invention, the cellulosic materials should first be bleached and then subjected to any desired printing and/or dyeing operation. Best results are also obtained when the cellulosic material is treated with a detergent composition prior to being impregnated with the phosphono-amide containing compositions (but after the printing and/or dyeing operation) so as to obtain a cellulosic material having a pH between 5.0 and 6.0. Any commercially available detergent composition may be employed provided it imparts the desired pH to the material.

The flame-retardant component of the compositions of this invention which are useful for imparting flame-retardant properties to cellulosic materials in the padding step comprise a substituted phosphono-amide of the formula:

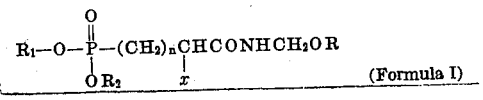

(Formula I)

wherein R is selected from the group consisting of hydrogen, an allyl or alkyl of up to six carbon atoms; $n$ is either 1, when $x$ is selected from the group consisting of hydrogen, methyl or a $-CH_2CONHCH_2OR$ group, or zero, when $x$ is a —

CH₂CONHCH₂OR group, and $R_1$ and $R_2$ each are selected from the group consisting of alkenyl, cycloalkyl, cycloalkenyl, alkoxyalkyl, alkoxyalkenyl, aryl, alkoxyarl, or alkylene radical, wherein the alkyl and alkenyl moieties have from one to six carbon atoms, and members of the group substituted by one or more halogen atoms selected from the group consisting of chlorine, and bromine, the terminal valency of any such alkylene groups being linked to a group of the formula:

(Formula II)

the free valency of which, if only one of $R_1$ or $R_2$ is alkylene, is linked to a further monovalent $R_1$ or $R_2$ radical, or $R_1$ and $R_2$ together represent a polymethylene chain containing from two to six carbon atoms linked to a second polymethylene chain containing two to six carbon atoms, via a spiro carbon, said polymethylene substituents selected from the group consisting of chlorine atoms, bromine atoms, methyl groups, and combinations thereof, the terminal valencies of said polymethylene chain being linked to a group of Formula II when said polymethylene chain is present. The remaining ingredients of the composition include from 1–5.0 weight percent of a polyethylene emulsion commonly sold under the trade name "Densimul," from 10—20 weight percent of a triazine-formaldehyde aminoplast, for example an aminoplast which is commonly sold under the trade name "Resin 23 Special," by American Cyanamid, from 2 to 4 weight percent of an amine hydrochloride, 0.1 to 0.3 weight percent, preferably 0.2 weight percent of a polyoxyethylene nonylphenyl ether commercially available under the trademark Igepal CO–630, and the balance of the composition being water. Particularly good results are obtained in the practice of the invention when the composition is adjusted to a pH of from 4.0 to 6.0.

Examples of the various substituted phosphono-amides which can be employed in the practice of the invention include, e.g., N-hydroxymethyl-3-(diethylphosphono) propionamide, N-hydroxymethyl-3-(diallylphosphono) propionamide, N-methoxymethyl-3-(bis(2,3-dichloropropyl) phosphono) propionamide, N-hydroxymethyl-3-(diethylphosphono)-2-methylpropionamide, N-hydroxymethyl-3-(2,2-dimethyltrimethylenephosphono) propionamide, N-hydroxymethyl-3-(1-methyltrimethylenephosphono) propionamide, N-hydroxymethyl-3-(bis(bromotrichloropropyl)phosphono) propionamide, N-allyoxymethyl-3-(diethylphosphono) propionamide. Particularly good results are obtained when N-hydroxymethyl-3-(diethylphosphono) propionamide is employed in the practice of the invention. This material available commercially from Ciba, Limited, is known as Pyrovatex.

According to another embodiment of the invention, it is also possible to employ either alone, or in combination with the substituted phosphono-amide compounds, tetrakis hydroxymethyl phosphonium chloride, sold under the trade name THPC, by Hooker Chemical Company.

The process of this invention is applicable to a wide variety of cellulosic materials, e.g., filaments, yarns, threads, and, particularly, woven or nonwoven fabrics. It is particularly effective with materials consisting of natural cellulose, such as cotton and linen, but it is also applicable to regenerated cellulose such as viscose rayon.

The invention is particularly useful in conjunction with the conventional cross-linking or resin finishing agents, such as the water soluble hardenable amine-formaldehyde condensates or aminoplasts. These include, for example, the well known condensates of formaldehyde and a triazine, such as the condensates of formaldehyde and melamine. As is well known, these various agents are commonly applied to textile materials in the form of aqueous solutions by padding. For instance, a cross-linking agent, such as an aminoplast, is usually dissolved in water. To facilitate the eventual curing of the agent in the material, an appropriate conventional catalyst, such as an acid-acting salt, e.g., an amine hydrochloride, is also included in the solution or bath. The catalyst is commonly added to the bath in an amount equal to about 0.2 to 0.6 weight percent.

PROCESS OF UTILIZING COMPOSITION

The application of the compositions of this invention, to cellulosic materials, provides for a simple, efficient, and economical way of rendering cellulosic materials flame-retardant. According to an embodiment of the invention, the cellulosic material is initially impregnated with a phosphono-amide containing composition, as defined hereinbefore, which has a maximum temperature of 110° F.

The cellulosic materials can be impregnated by any of the conventional means for impregnating a fabric, textile, etc. For example, the phosphono-amide compositions can be applied to the fabric by spraying, dipping, as well as padding procedures, all of which are well known to those skilled in the art. For best results, it is preferred that the novel compositions be applied to the cellulosic materials by padding.

Impregnation of the cellulosic material with the phosphono-amide composition is preferably by double dipping and squeezing out through a pad in order to obtain a maximum pickup, preferably 100 percent. To insure that 100 percent pickup is obtained, various means are employed for automatically determining the solids pickup of the phosphono-amide containing compositions. One particularly useful device which may be employed in the practice of the invention is produced by the Uster Corporation and sold under the trade name of "Aquatec." This impregnation procedure results in the deposition of between 15 percent and 50 percent solids, and preferably between 20 percent and 30 percent solids by weight of the total cellulosic material.

After the cellulosic material has been impregnated with the phosphono-amide composition, the cellulosic material is then dried at a temperature sufficient to reduce the moisture content of the cellulosic material such that moisture content is no greater than five percent and preferably no greater than 3 percent by weight of the total cellulosic material. The drying operation must be carried out at a temperature not greater than 400° F. If temperatures in excess of this value are employed, too rapid drying of the material occurs, causing the phosphono-amide to migrate to the surface of the treated material, causing sublimation during curing as well as a decrease in the flammability properties of the material. The minimum temperature at which the drying operation is to be carried out is 220° F.

Once the cellulosic materials have been dried, the cellulosic material is then subjected to a curing operation. In order for best results to be achieved, it is necessary that the temperature of the cellulosic materials be maintained at a temperature of at least 320° F. for a period of time sufficient to obtain the necessary cure, and preferably from 3 to about 8 minutes. As mentioned earlier, the curing operation is preferably carried out at oven temperatures of from 310° F. to 350° F. The curing operation is carried out in a loop or festoon curer having no compression rolls and of a type commercially available as specified above.

The curing temperatures, that is, the actual material temperatures, set forth above are extremely important in the practice of this invention. It is therefore necessary to carefully check the temperature of the cellulosic material during the curing operation. This can be achieved by employing any temperature indicator, for example, temperature sensitive papers (thermal papers, pyrometers, etc.) On the cellulosic material to be certain that the desired curing cloth temperature has been reached and is being maintained. It is also possible to employ a radiomatic pyrometer for the same purpose. Carrying out the curing operation at the specified oven temperatures, and accordingly desired material temperatures, in a loop or festoon curer, overcomes one of the major problems encountered when prior art procedures were followed, namely, surfacing of the composition and its adherance to curing rolls, thereby causing considerable pickup on the goods and, as a result, requiring the rolls to be thoroughly cleaned prior to the processing of any additional goods.

It cannot be emphasized too strongly that the temperature of the cellulosic materials during curing must be distinguished from the so-called "oven temperature" which is usually a measure of the temperature at which curing operations are normally carried out. The temperature of the cellulosic material must be maintained at a constant e.g., between 320° F and 330° F) during the entire curing operation. A constant temperature can be achieved by employing, if need be, a specially designed radiation head in the oven. Such head, identified as an auxiliary heater in FIG. 2, can extend the length of the oven, or any part of the length, or be at the exit of the oven. We have found that a gas heater is quite suitable to effect any localized heating or augmented heating, although resistance, infrared or other types are usable. However, the invention is fully operable without an auxiliary heater, assuming the teachings herein are reasonably followed by persons skilled in the art using a loop curing oven with nonheated rolls, and without nip rolls that squeeze the web.

Optimum results have been obtained when the material is maintained at a temperature of 320° F during curing for a period of 5 minutes.

Figure 2:
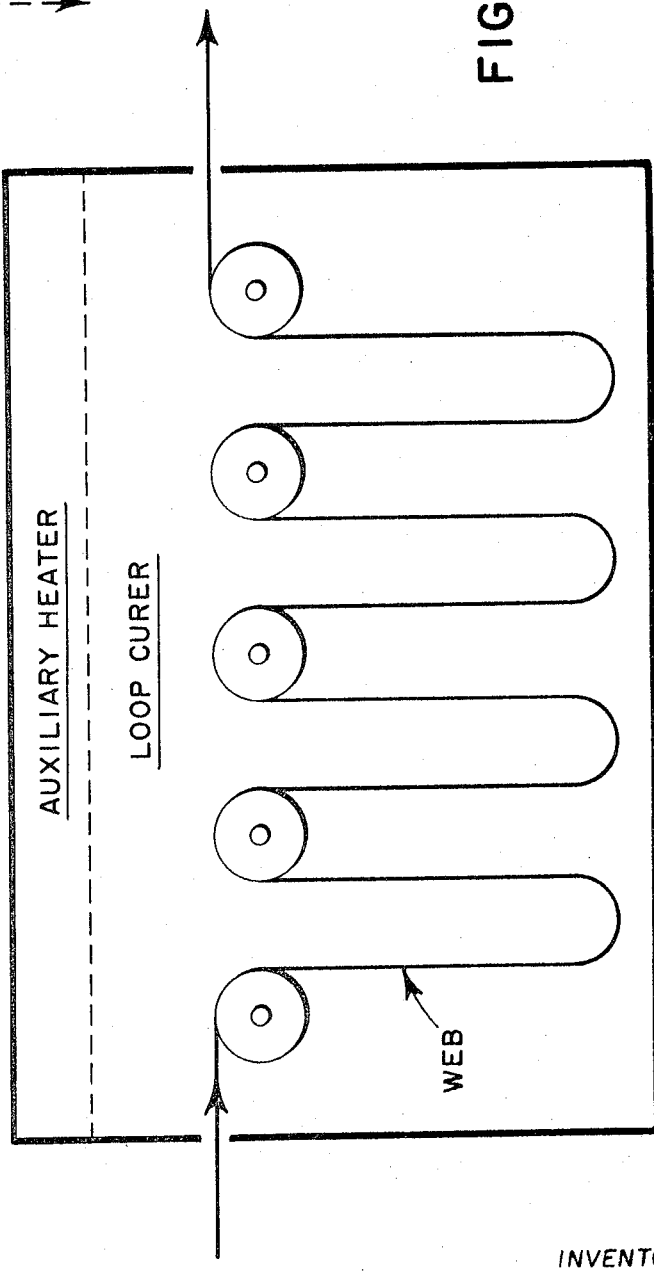
FIG. 2 shows diagrammatically the curing step utilizing a loop-curing oven with an auxiliary heater at the terminus within the oven.

As set forth above, it is of special importance to use a continuous movement loop- or festoon-curing oven, as diagrammed in FIG. 2, wherein a web is festooned over the conveying rollers and hangs freely supported thereby, with no feed or nip rolls acting compressively to squeeze composition to the material surface where it would normally collect, requiring the aforedescribed down time for cleaning in order to avoid subsequent pickup on web material passing through the oven.

According to a further embodiment of the invention, the cured cellulosic material is then treated with a dilute aqueous solution, preferably 0.25 percent solution of soda ash, or a dilute aqueous solution, i.e., containing 0.4 percent soda ash and 1 percent perborate. The cured product is thereafter washed with a dilute aqueous, preferably 0.25 percent solution of a nonionic detergent and finally rinsed with hot water. The various solutions employed are maintained at temperatures of from 160° F to 200°F.

The nonionic detergents which can be employed are well known to those skilled in the art. Various examples of suitable nonionic detergents which can be employed in the practice of this invention are set forth in Schwartz and Perry, *Surface Active Agents*, Interscience Publishers, Inc., 1949, pages 202-217

The after treatment of the cured cellulosic materials is preferably carried out by passing the cured cellulosic material initially through three separate containers of 0.25 percent soda ash and then passing the cured cellulosic material through three containers of 0.25 percent of a nonionic detergent solution. These percentages are illustrative only, since broader ranges can be used. Thereafter, the cured cellulosic material is then preferably rinsed by passing it through four tubs or containers of hot water. Each tub or container is equipped with hot sprays at each nip in order to provide for a more efficient operation.

Having washed the cured cellulosic material in the manner set forth above, the cellulosic material is then permitted to dry and if necessary reframed. Preferably the reframing takes place on tenter frames. Optional ingredients, such as bluing agents and optical brighteners may also be employed.

Cellulosic materials which have been treated with the substituted phosphono-amide containing compositions of this invention, and in the manner set forth hereinbefore, have been tested and found to pass the Vertical Flammability AATCC test method after repeated washings.

ILLUSTRATIVE EXAMPLES

A composition was made consisting of the following ingredients:

| Ingredient | Amount (weight percent) |
| --- | --- |
| N-hydroxymethyl-3-(diethylphosphono) Propionamide | 32 |
| polyethylene emulsion | 5 |
| triazine formaldehyde condensate* | 2 |
| urea | 1 |
| ammonium chloride | 0.4 |
| Igepal CO-630 | 0.2 |
| water | Balance |

*Cyanamid Resin 23—Special

This composition was found to be particularly useful for imparting flame-retardant properties to cellulosic materials when employed in the manner set forth in this specification. The pH of this formulation is 4.5-5.5.

A still further example of a composition which may be employed in the practice of the invention is:

| Ingredient | Amount |
| --- | --- |
| N-hydroxymethyl-3-(diethylphosphono) propionamide | 440 lb. |
| Resin 23 Special | 138 lb. |
| Densimal (polyethylene emulsion) | 27 lb. |
| amine hydrochloride (35% solution) (2 amino-2-methyl-propanol-1-hydrochloride) | 48 lb. |
| Igepal CO-630 | 1 quart |
| water | balance to make a 150 gallon mix |

The pH of this formulation is 4.6-5.5.

After considering the foregoing description and the immediately preceding examples, it should be apparent that the objects set forth at the outset of this specification have been successfully achieved.

In retrospect the invention, which is in the nature of discovery, solves the problem of nonfouling of rolls by use of a type of oven that does not have rolls which will become sufficiently hot to effect surfacing of the retardant composition or nip rolls or other rolls which will squeeze the material to a degree which will cause surfacing. Attempts have been made using other types of curing ovens without success in conjunction with the substituted phosphono-amide type of retardant composition for which the method of this invention is intended. However, it is believed that the invention is not necessarily limited to the specific type of loop-curing oven identified herein but could, in fact, be practiced as a method in any oven where the conditions for preventing surfacing of the composition are made. For example, it would be possible to construct an oven wherein the web is fed downwardly from the top and then upwardly again through the top in an elongated loop of any desired height. Depending upon the length of web in the oven, speed would be determined to achieve the proper curing time, as will be readily apparent. Such an oven, if made very high, could utilize our principle of auxiliary heater or heaters for effecting uniform temperature. In any event, such an oven would not have rolls that would even touch the web within the heated atmosphere and, or course, there need be no feed or nip rolls therein.

While it is not possible to set down all conditions of design for numerous oven structures which could be designed to practice the method of the invention, it can be stated as a generality that so long as rolls, if used within the oven, are not permitted to have a temperature rise up to the point where surfacing is caused, nor a roll pressure to a degree causing squeezing of the retardant composition to the surface of the web, such composition is usable for mass production. Otherwise, the rolls foul very quickly necessitating a halt in production for cleaning and thus rendering the specified retardant composition uneconomical for general industrial purposes.

We claim:

1. A method of rendering substantially cellulosic material flame-retardant which comprises padding the material with an aqueous composition comprising as the flame-retardant ingredient a member selected from the group consisting of N-hydroxymethyl-3-(diethylphosphono) propionamide, N-hydroxymethyl-3-(diallylphosphono) propionamide, N-methoxymethyl-3-(bis(2,3-dichloropropyl) phosphono) propionamide, N-hydroxymethyl-3-(diethylphosphono)-2-methylpropionamide, N-hydroxymethyl-3-(2,2-dimethyltrimethylenephosphono) propionamide, N-hydroxymethyl-3-(bis(bromotrichloropropyl)phosphono) propionamide, and N-allyloxymethyl-2-(diethylphosphono) propionamide; drying said cellulosic material at an air temperature within the range 220° F to 400° F for a period sufficient to reduce the moisture content of the cellulosic material to a maximum of 5 percent moisture content by weight of the cellulosic material; curing said material by heat in a continuous movement loop-curing oven wherein said material is festooned over supporting over supporting rolls without being subjected to compressive forces tending to squeeze the composition to the surface and wherein the temperature of the material is maintained in the range 320° F–330° F in said oven for a period of time sufficient to effect curing.

2. A method as set forth in claim 1, including subjecting said web to heat of said oven and to auxiliary heating in passing through said curing oven to insure that the material of said web has a temperature within the aforementioned range.

3. A method as set forth in claim 1, including the step of drying said material intermediate padding and curing at an air temperature no greater than 400° F, and including subjecting said web to localized heating in passing through said curing oven to insure that the material of said web has a temperature within the aforementioned range.

4. A method as set forth in claim 1 wherein the flame-retardant component is N-hydroxymethyl-3-(diethyl-phosphono) propionamide.

5. A method as set forth in claim 1, wherein the cellulosic material is washed with a detergent subsequent to the drying step.

6. A method as set forth in claim 1, wherein the material is washed subsequent to the curing step.

* * * * *